US012769171B2

(12) United States Patent
Kao et al.

(10) Patent No.: US 12,769,171 B2
(45) Date of Patent: Oct. 20, 2026

(54) DISPLAY MODULE

(71) Applicant: AUO Corporation, Hsinchu City (TW)

(72) Inventors: Wang-Shuo Kao, Hsinchu City (TW); Shang-Wei Hsieh, Hsinchu City (TW); Jia-Hong Wang, Hsinchu City (TW); Yi-Wen Lin, Hsinchu City (TW); Pei-Wan Hsiao, Hsinchu City (TW); Hao-Shiun Yang, Hsinchu City (TW); Min-Zi Hong, Hsinchu City (TW); Ya-Ling Hsu, Hsinchu City (TW); Chen-Hsien Liao, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 183 days.

(21) Appl. No.: 18/961,527

(22) Filed: Nov. 27, 2024

(65) Prior Publication Data

US 2025/0355305 A1 Nov. 20, 2025

(30) Foreign Application Priority Data

May 15, 2024 (TW) ................................ 113117982

(51) Int. Cl.

*G02F 1/1362* (2006.01)
*G02F 1/1333* (2006.01)
*G02F 1/1335* (2006.01)

(52) U.S. Cl.

CPC .................. *G02F 1/136295* (2021.01); *G02F 1/133388* (2021.01); *G02F 1/133504* (2013.01); *G02F 1/133531* (2021.01)

(58) Field of Classification Search

CPC ......... G02F 1/136295; G02F 1/133388; G02F 1/133504; G02F 1/133531; G02F 1/133528; G02F 1/133548; G02F 1/1333; G02F 1/1335; G02F 1/1347; G09F 9/3026; G09F 9/33; G09F 9/35

See application file for complete search history.

(56) References Cited

U.S. PATENT DOCUMENTS

2020/0073162 A1 3/2020 Shin et al.
2020/0103684 A1 4/2020 Huang
2024/0160062 A1* 5/2024 Sun .................... G02F 1/13336

FOREIGN PATENT DOCUMENTS

CN 103525316 A 1/2014
CN 111653207 A 9/2020

* cited by examiner

*Primary Examiner* — Charles S Chang
(74) *Attorney, Agent, or Firm* — WPAT, PC

(57) ABSTRACT

A display module which includes a LCD display panel with a light exiting region and a fringe region, and a LED display panel and a metal grid layer is provided. The LCD display panel includes two crossed polarizers and a liquid crystal layer located between the polarizers. LED display panel is disposed on the fringe region of the LCD display panel, while the metal grid layer is located between the polarizers and overlaps the LCD display panel in the direction of the normal line of the polarizers. The LED display panel emits the light toward the fringe region, and the light transmits the polarizers and the metal grid layer. The metal grid layer includes a plurality of grid wires, and the height of each grid wire is larger than 0.1 μm.

15 Claims, 7 Drawing Sheets

DISPLAY MODULE

RELATED APPLICATIONS

This application claims priority to Taiwan Application Serial Number 113117982, filed May 15, 2024, which is herein incorporated by reference in its entirety.

BACKGROUND

Technical Field

The present disclosure relates to a display module. More particular, the present disclosure relates to the display module with liquid crystal display technology.

Description of Related Art

One of the main methods for producing large format displays (LFDs) is splicing technology. The splicing technology is to splice a plurality of smaller display panels into a large-sized display. In order to meet the demands for large-sized displays, the development of splicing technology has gradually increased. However, the technical challenges faced by splicing technology is that even though the side traces are developed to connect backside chips, so as to narrow the frame of the displays, the side traces still occupy a certain space in the displays. As a result, for the requirements of high-resolution displays, the distance between the outermost pixels of the display panel and the edge of the display is larger than the spacing between pixels, thereby causing the discontinuous images on the large-sized displays produced by splicing technology.

SUMMARY

Accordingly, the disclosure is to provide a display module which is able to improve the continuity of the images on the spliced display.

At least one embodiment of the disclosure provides a display module. The display module includes a LCD panel, a LED display panel and a metal grid layer. The LCD panel has a light exiting region and a fringe region surrounding the light exiting region, and the LCD panel includes two polarizers and a liquid crystal layer. The polarizers which are crossed to each other are located at two opposite sides of the LCD panel separately. The liquid crystal layer is disposed between the polarizers. The LED display panel is disposed on the fringe region of the LCD panel and used to emit a light ray toward the fringe region. The metal grid layer is disposed between the polarizers and overlaps the LED display panel in a direction of a normal line of the polarizers. The light ray passes through the polarizers and the metal grid layer. The metal grid layer includes a plurality of grid wires juxtaposed to each other, where a longitudinal axis of each of the grid wires extends along with an axis direction. The axis direction is perpendicular to the normal line of the polarizers. A height of each of the grid wires is larger than 0.1 μm.

At least one embodiment of the disclosure provides a display module. The display module includes a LCD panel, a LED display panel and a scattering layer. The LCD panel has a light exiting region and a fringe region surrounding the light exiting region, and the LCD panel includes two polarizers crossed to each other and a liquid crystal layer. The liquid crystal layer is disposed between the polarizers. The LED display panel is disposed on the fringe region of the LCD panel and used to emit a light ray toward the fringe region. The scattering layer is disposed between the polarizers and overlaps the LED display panel. The light ray passes through the polarizers and the scattering layer. The scattering layer includes a plurality of scattering particles, where a total volume of the scattering particles is larger than 80% of a volume of the scattering layer, and a radius of each of the scattering particles is between 220.4 nm and 7800 nm.

According to the aforementioned embodiments, the LED display panel is disposed on the fringe region of the LCD panel, so that the LED display panel can emit the light ray toward the fringe region. As a result, the light ray emitted by the LED display panel can enter the user's eyes through the fringe region of the LCD panel. Therefore, the discontinuity of the images due to the seams decreases, and thereby improving the quality of images.

BRIEF DESCRIPTION OF THE DRAWINGS

To illustrate more clearly the aforementioned and the other features, merits, and embodiments of the present disclosure, the description of the accompanying figures are as follows.

DETAILED DESCRIPTION

Figure 1:
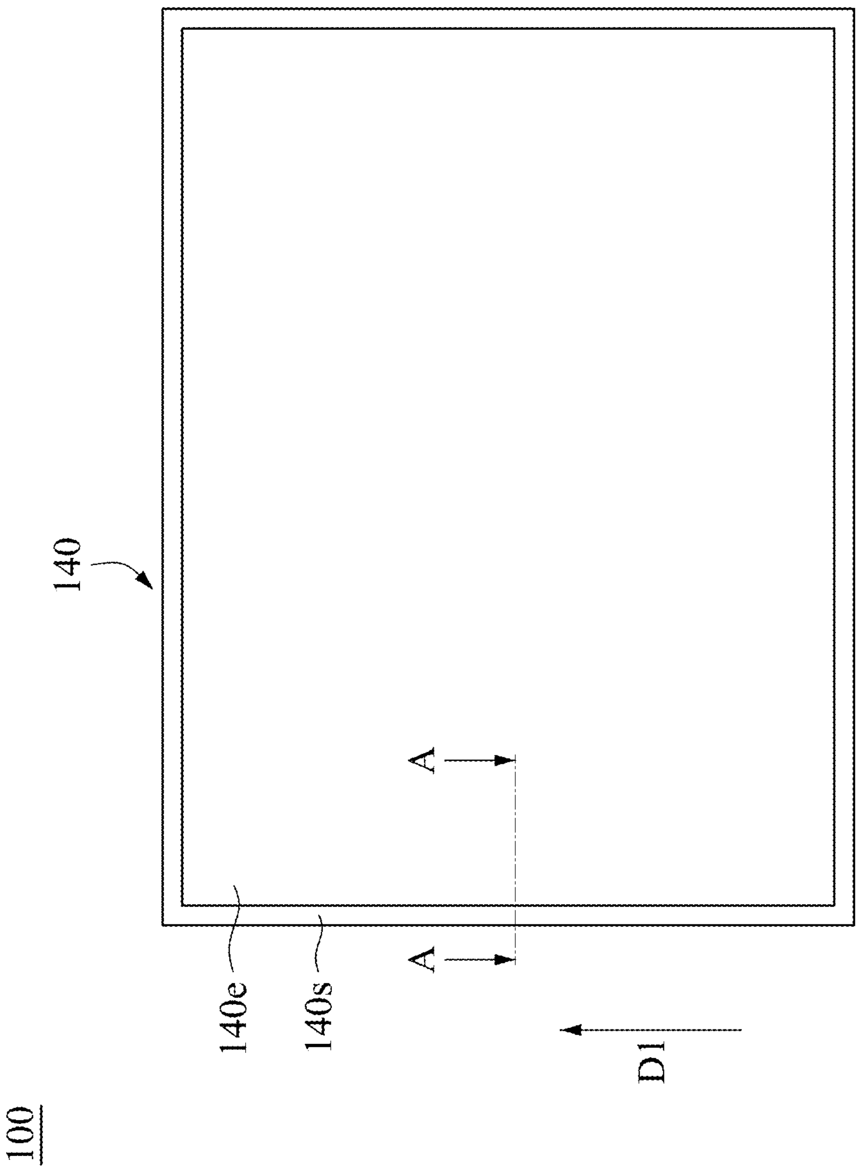
FIG. 1 illustrates a top view of a display module in accordance with at least one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description, the dimensions (such as lengths, widths and thicknesses) of components (such as layers, films, substrates and regions) in the drawings are enlarged not-to-scale, and the number of components may be reduced in order to clarify the technical features of the disclosure. Therefore, the following illustrations and explanations are not limited to the number of components, the number of components, the dimensions and the shapes of components, and the deviation of size and shape caused by the practical procedures or tolerances are included. For example, a flat surface shown in drawings may have rough and/or non-linear features, while angles shown in drawings may be circular. As a result, the drawings of components shown in the disclosure are mainly for illustration and not intended to accurately depict the real shapes of the components, nor are intended to limit the scope of the claimed content of the disclosure.

Further, when a number or a range of numbers is described with "about," "approximate," "substantially," and the like, the term is intended to encompass numbers that are within a reasonable range considering variations that inherently arise during manufacturing as understood by one of ordinary skill in the art. In addition, the number or range of numbers encompasses a reasonable range including the number described, such as within +/−30%, +/−20%, +/−10% or +/−5% of the number described, based on known manufacturing tolerances associated with manufacturing a feature having a characteristic associated with the number. The words of deviations such as "about," "approximate," "substantially," and the like are chosen in accordance with the optical properties, etching properties, mechanical properties or other properties. The words of deviations used in the optical properties, etching properties, mechanical properties or other properties are not chosen with a single standard.

Figure 2:
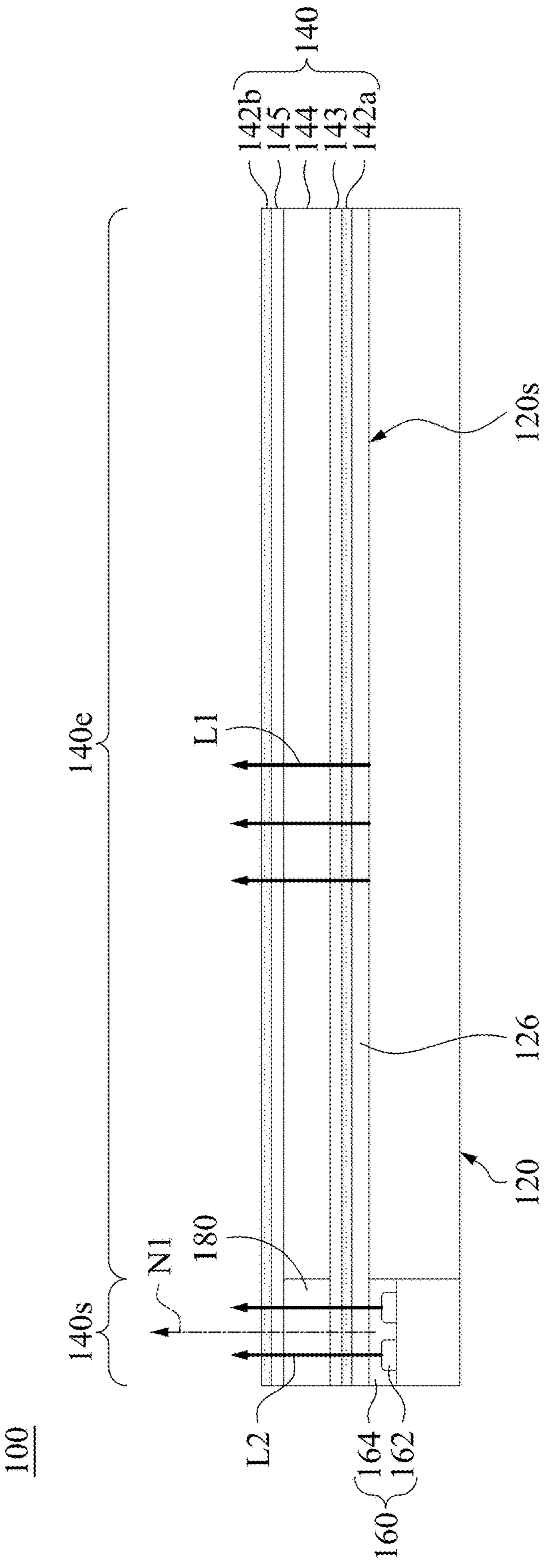
FIG. 2 illustrates a locally cross-sectional view of a display module in accordance with at least one embodiment of the present disclosure.

FIG. 1 illustrates a top view of a display module 100 in accordance with one embodiment of the present disclosure, while FIG. 2 illustrates a cross-sectional view taken along a line A-A of the display module 100 in FIG. 1. Referring to FIG. 1 and FIG. 2, the display module 100 includes a backlight module 120, a liquid crystal display (LCD) panel 140, a light-emitting diode (LED) display panel 160 and a metal grid layer 180.

The backlight module 120 is used to emit a light ray L1 toward the LCD panel 140. Specifically, the backlight module 120 may include a light source module (not shown) and a light guide component (not shown). Take the edge-lit backlight module as an example, the light source module of the backlight module 120 may be disposed adjacently to the light guide component, where the light source module emits the light ray L1 toward the light guide component. The light ray L1 is led by the light guide component (e.g., light guide plate) to leave the backlight module 120 through a light exiting surface 120*s*. In the embodiment, the light source module further includes a plurality of light emitting components (e.g., LEDs) (not shown) and a circuit substrate (not shown) controlling the light emitting components.

The LCD panel 140 is disposed on the backlight module 120, and the LCD panel 140 includes a light exiting region 140*e* and a fringe region 140*s* surrounding the light exiting region 140*e*. The LCD panel 140 includes a polarizer 142*a*, a polarizer 142*b* and a liquid crystal layer 144. The polarizer 142*a* and the polarizer 142*b* are located at two opposite sides of the LCD panel 140 separately, while the liquid crystal layer 144 is disposed between the polarizer 142*a* and the polarizer 142*b*.

It is worth mentioning that the LCD panel 140 in the embodiment is a normally black LCD panel, where the polarization direction of the polarizer 142*a* is crossed to the polarization direction of the polarizer 142*b*. In various embodiments of the disclosure, the LCD panel 140 may be but not limited to a vertical alignment (VA) LCD panel, an in plane switching (IPS) LCD panel or other LCD panels.

Due to the structure of the backlight module 120, the emitting range of the light ray L1 is limited within the light exiting region 140*e* instead of extending to the fringe region 140*s*. In other words, the backlight module 120 does not emit the light ray L1 toward the fringe region 140*s* of the LCD panel 140. In addition, the LCD panel 140 further includes a thin film transistor (TFT) array substrate 143 and a light filter substrate 145. The liquid crystal layer 144 is disposed between the TFT array substrate 143 and the light filter substrate 145.

The TFT array substrate 143 includes a glass substrate and a TFT array disposed on the glass substrate without being illustrated in figures. In addition, the light filter substrate 145 includes another glass substrate and a filter, such as a color filter, which is disposed on the glass substrate. The TFT array is opposite to the filter, that is, the TFT array and the filter are located between the aforementioned glass substrates.

The LED display panel 160 is disposed on the fringe region 140*s* of the LCD panel 140, and at least a part of the fringe region 140*s* of the LCD panel 140 overlaps the LED display panel 160 in a direction of a normal line N1. Specifically, the LED display panel 160 is used to emit a light ray L2 toward the fringe region 140*s* of the LCD panel 140. Since the fringe region 140*s* overlaps the LED display panel 160 in the direction of the normal line N1, the light ray L2 may travel in the direction of the polarizer 142*a* toward the polarizer 142*b* and pass through the fringe region 140*s* of the LCD panel 140.

Figure 3:
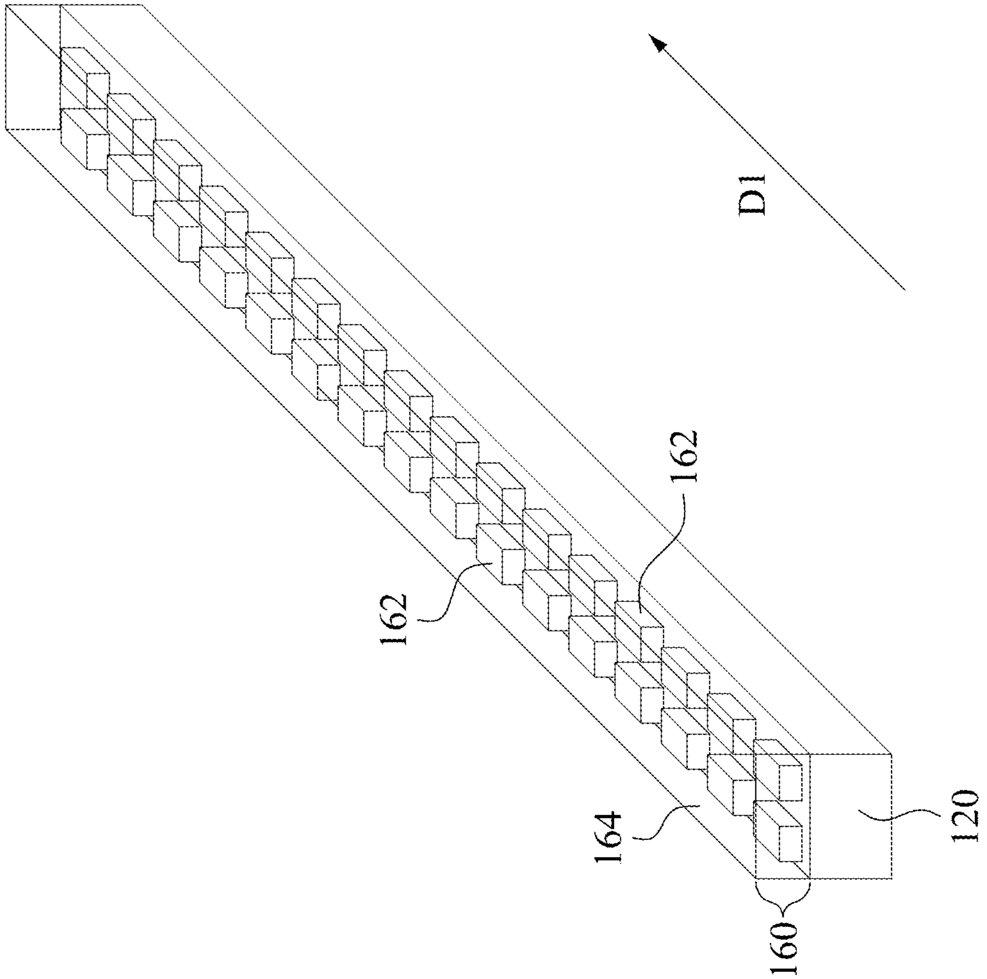
FIG. 3 illustrates a locally stereoscopic view of a display module in accordance with at least one embodiment of the present disclosure.

Referring to FIG. 2 and FIG. 3, the LED display panel 160 includes a plurality of LED components 162. The LED components 162 are disposed adjacently to the side surface of the backlight module 120 and arranged in at least two lines along with an extending direction D1 of the fringe region 140*s* of the LCD panel 140 (as shown in FIG. 1). The LED components 162 may be organic light emitting diodes (OLEDs), micro LEDs or other LED components. Each of the LED components 162 may but not limited to be a white light LED.

Since the polarization direction of the polarizer 142*a* and the polarization direction of the polarizer 142*b* are crossed to each other, when there is no light scattering materials or optical phase retarder, such as a half-wave plate, between the polarizer 142*a* and the polarizer 142*b*, the light ray L2 emitted by the LED display panel 160 is blocked by the polarizer 142*a* and the polarizer 142*b*, so that the light ray L2 is unable to pass through the fringe region 140*s* of the LCD panel 140.

Figure 4:
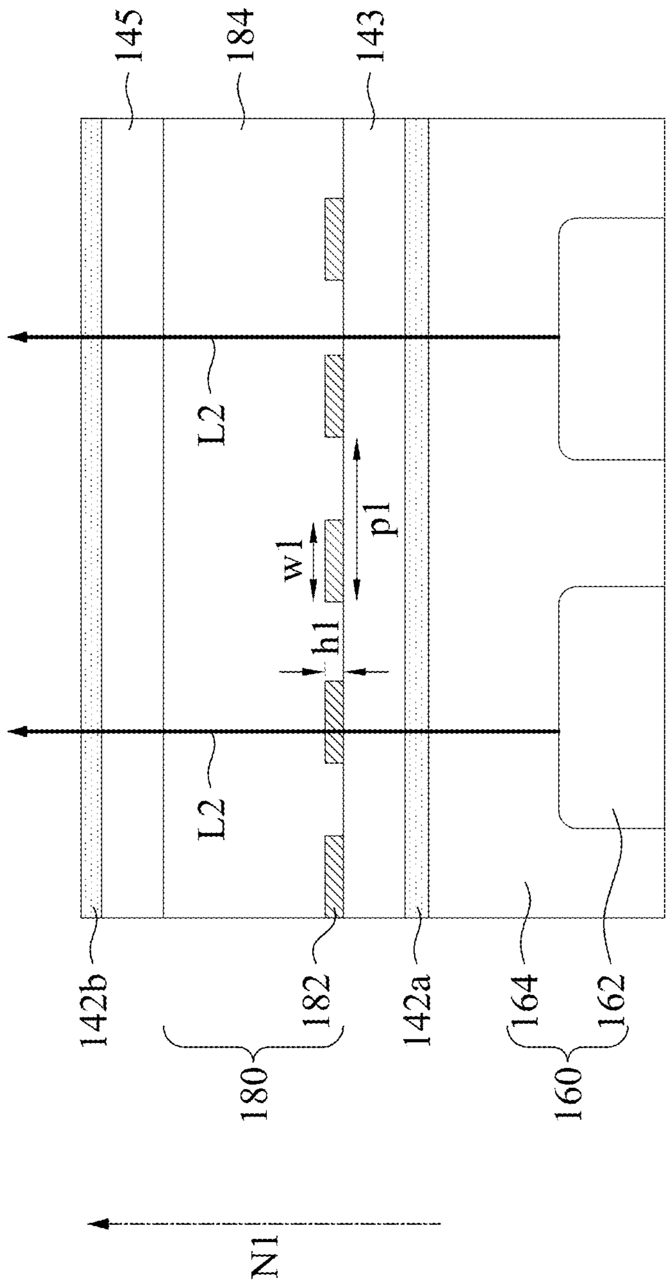
FIG. 4 illustrates a locally-enlarged cross-sectional view of a display module in accordance with at least one embodiment of the present disclosure.

In order to solve the issue that the light ray L2 emitted by the LED display panel 160 is blocked by the polarizer 142*a* and the polarizer 142*b*, the LCD panel 140 of at least one embodiment includes a depolarizing structure. Referring to FIG. 2 and FIG. 4, the display module 100 of the embodiment includes the metal grid layer 180. The metal grid layer

180 is disposed between the polarizer 142*a* and the polarizer 142*b* and overlaps the LED display panel 160 in the direction of the normal line N1 of the polarizer 142*a* and the polarizer 142*b*. As a result, the light ray L2 may pass through the polarizer 142*a*, the polarizer 142*b* and the metal grid layer 180. Specifically, when the light ray (e.g., the light ray L2) passes through the polarizer 142*a*, and then a polarized light ray with one polarizing direction is formed, the polarizing direction and the polarization state of the polarized light may be changed by the metal grid layer 180. Thus, the polarized light ray (or a part of the polarized light ray) may pass through the polarizer 142*b*.

Figure 5:
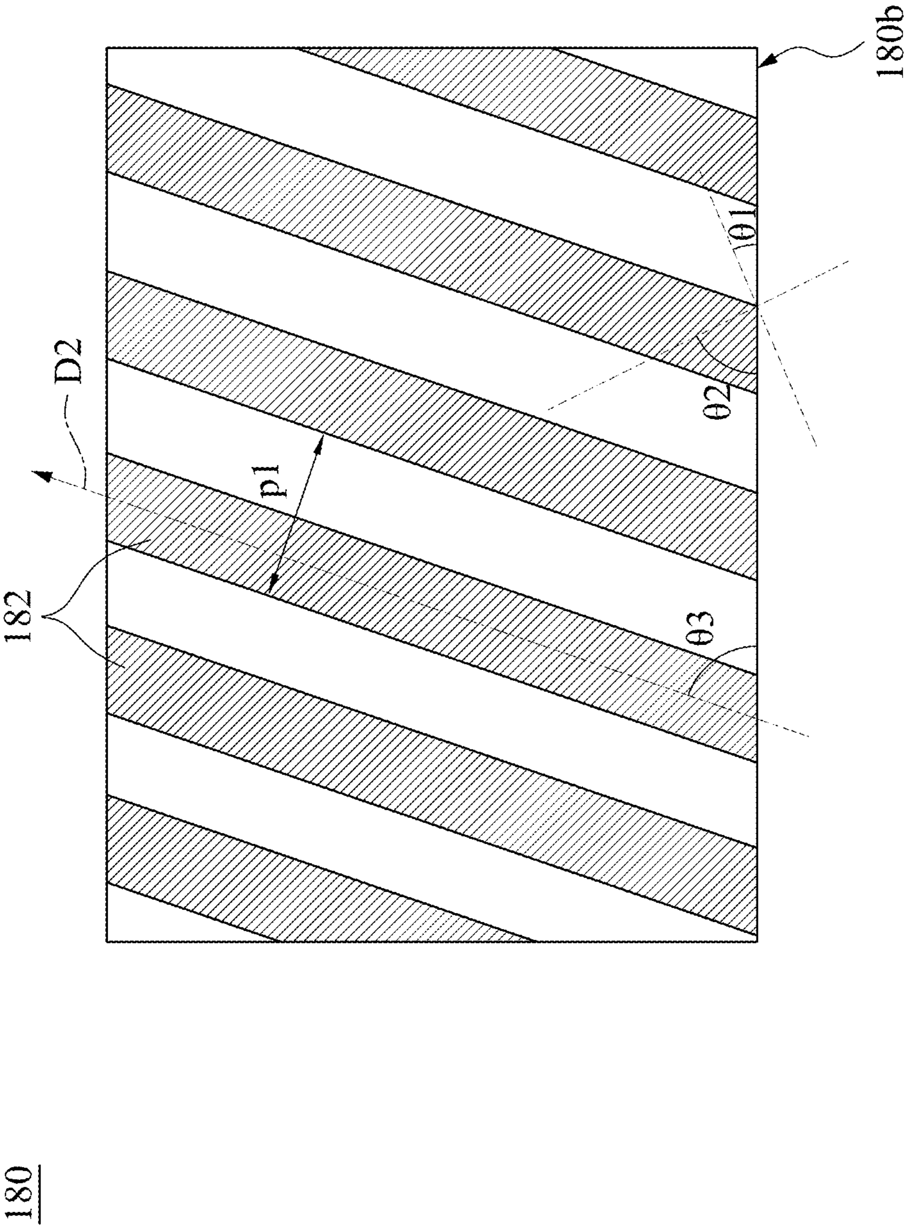
FIG. 5 illustrates a locally top view of a metal grid layer in accordance with at least one embodiment of the present disclosure.

For instance, referring to FIG. 4 and FIG. 5, the metal grid layer 180 includes a plurality of grid wires 182 which are juxtaposed to each other, while a longitudinal axis (not denoted) of each grid wire 182 extends along with an axis direction D2, where the axis direction D2 is perpendicular to the normal line N1 of the polarizer 142*a* and the polarizer 142*b*. The grid wires 182 overlap the polarizer 142*a* and the polarizer 142*b* in the direction of the normal line N1. The height h1 of each grid wire 182 is larger than 0.1 μm, and the width w1 of each grid wire 182 is smaller than 0.15 μm. In addition, the pitch p1 between grid wires 182 is smaller than 0.3 μm. Thus, when light ray L2 passes through the polarizer 142*a* so as to form a polarized light, the grid wires 182 are able to change the polarization direction of the polarized light.

As shown in FIG. 5, the metal grid layer 180 includes an edge line 180*b*, and an angle θ1 is between the polarization direction of one of the polarizers (e.g., the polarizer 142*a*) and the edge line 180*b*, while an angle θ2 is between the polarization direction of the other one of the polarizers (e.g., the polarizer 142*b*) and the edge line 180*b*. The value of an angle θ3 between the axis direction D2 of each of the grid wires 182 and the edge line 180*b* is within plus or minus 3 degree of a mean value of the angle θ1 and the angle 82. That is, the equation of angle 81, angle θ2 and angle θ3 is 63=(81+82)/2±3°.

The materials of the grid wires 182 include aluminum (Al), copper (Cu) or similar metals. Among the materials, the effect of changing the polarization direction of the grid wire 182 including aluminum is better than the grid wire 182 including copper. Although each of the grid wires 182 in the embodiment is parallel to each other, the disclosure is not limited to the embodiment. In other embodiments, each of the grid wires 182 may be non-parallel.

Referring to FIG. 2, the backlight module 120 further includes at least an optical film 126, and the optical film 126 is located at one side of the backlight module 120 facing to the LCD panel 140. It is worth mentioning that the optical film 126 extends to the fringe region 140*s* from the light exiting region 140*e* of the LCD panel 140 and covers the LED display panel 160. As a result, the light ray L1 emitted by the backlight module 120 and the light ray L2 emitted by the LED display panel 160 may pass through the optical film 126, and the difference of the light extraction efficiency (including the light filed and the light uniformity) between the light ray L1 and the light ray L2 may decrease due to the adjustment of the optical film 126.

Specifically, the optical film 126 may include a prism sheet (not shown) and a diffuser sheet (not shown). After being adjusted by the prism sheet, the light field of the light ray L1 and the light ray L2 are approximately the same. In addition, the light ray L1 and the light ray L2 may be diffused by passing through the diffuser sheet, so as to improve the light uniformity. As a result, the user's sensitivity to the difference between the exiting light ray L1 and the exiting light ray L2 may be reduced when the user is viewing the display module 100, and thereby improving the continuity of the images.

It is worth mentioning that the optical film 126 is disposed on the LED display panel 160. In order to prevent the LED components 162 from being crushed or damaged by the optical film 126, the LED display panel 160 further includes an encapsulation material 164 (denoted in FIG. 2). The encapsulation material 164 encapsulates the surface of the LED components 162, so as to protect the LED components 162. The encapsulation material 164 may be translucent materials, such as optical clear adhesives or other similar materials.

Figure 6:
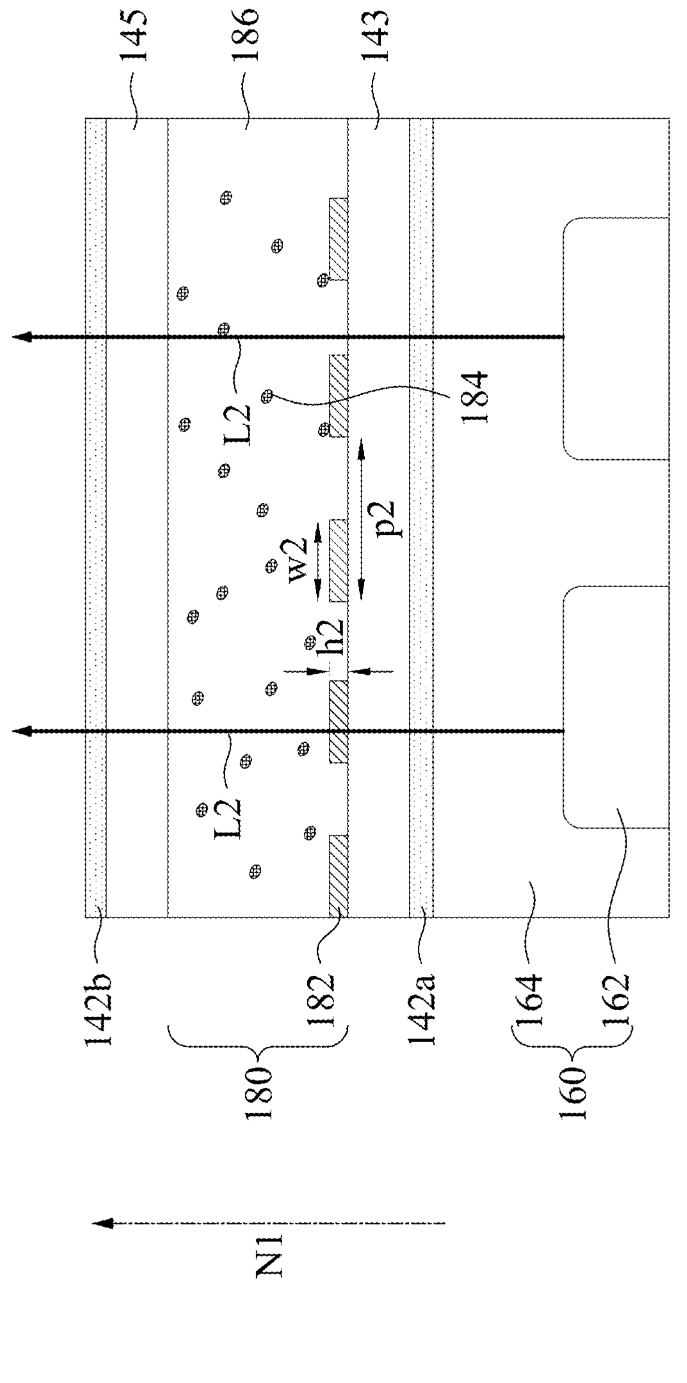
FIG. 6 illustrates a locally cross-sectional view of a display module in accordance with at least another one embodiment of the present disclosure.

Referring to FIG. 6, in another embodiment, the metal grid layer 180 may include a plurality of scattering particles 184 and a sealant material 186. The sealant material 186 is disposed on the grid wires 182, while the scattering particles 184 are distributed in the sealant material 186. The sealant material 186 may include adhesive materials, such as silicone, acrylic or other similar materials, and the visible light transmittance of the sealant material 186 is between 20% and 95%. The scattering particles 184 may be inorganic particles such as titanium dioxide ($TiO_2$), polymer particles or similar materials. The difference between the refractive index of the scattering particles 184 and the refractive index of the sealant material 186 is more than 0.3. When the light ray L2 passes through the polarizer 142*a* so as to form a polarized light entering the sealant material 186, the scattering particles 184 may destroy the linear polarization of the light ray L2. Thus, the polarization state of a part of the light ray L2 is changed, so that the light ray L2 is able to pass through the polarizer 142*b*.

In the embodiment, the total volume of the scattering particles 184 is larger than 20% of a volume of the metal grid layer 180, so that the linear polarization of the light ray L2 is destroyed. It is worth mentioning that the height h2 of each grid wire 182 is between 0.1 μm and 0.9 μm, and the width w2 of each grid wire 182 is smaller than 5 μm. In addition, the pitch p2 between the grid wires 182 is smaller than 6 μm.

In the embodiment, the value of the angle θ3 between the axis direction D2 of each of the grid wires 182 and the edge line 180*b* (i.e., the angle between the polarization direction of the polarizer 142*a* and the edge line 180*b*) is within plus or minus 15 degree of a mean value of the angle θ1 and the angle θ2 (i.e., the angle between the polarization direction of the polarizer 142*b* and the edge line 180*b*). That is, the equation of θ1, θ2 and θ3 is θ3=(θ1+θ2)/2±15°.

Accordingly, compared to the situation that the metal grid layer 180 is lack of the scattering particles 184, the grid wires 182 with smaller dimensions and shorter pitches may be used in the situation that the metal grid layer 180 with the scattering particles 184 whose total volume is larger than 20% of the volume of the metal grid layer 180. In other words, in the metal grid layer 180 including the scattering particles 184, the grid wires 182 with smaller heights and smaller widths are used, and the grid wires are disposed with smaller pitches.

Figure 7:
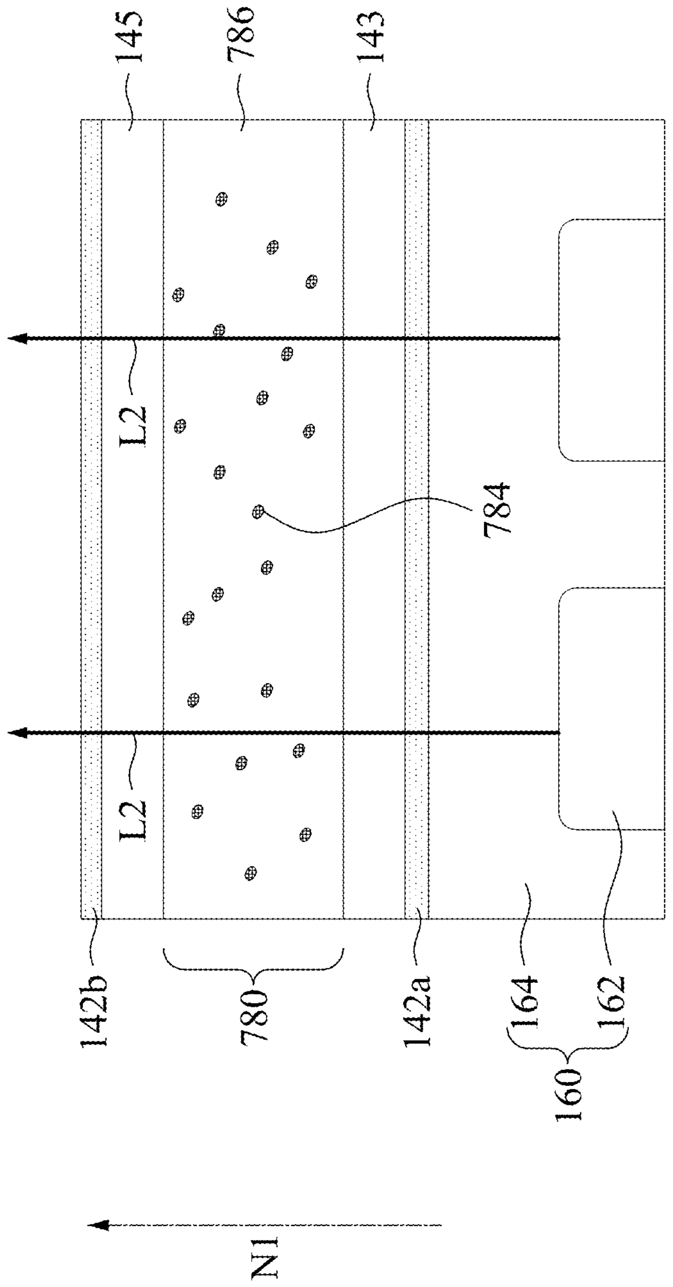
FIG. 7 illustrates a locally cross-sectional view of a display module in accordance with at least another one embodiment of the present disclosure.

However, the display module 100 of the disclosure is not limited to include the metal grid layer 180. Referring to FIG. 7, in another embodiment of the disclosure, the display module (not denoted) is similar to the display module 100. Specifically, the display module also includes the backlight module 120, the LCD panel 140 and the LED display panel 160. The difference between this display module and the display module 100 is that the display module includes a scattering layer 780.

The scattering layer 780 is disposed between the polarizer 142*a* and the polarizer 142*b* and overlaps the LED display panel 160. The light ray L2 emitted by the LED display panel 160 passes through the polarizer 142*a*, the polarizer 142*b* and the scattering layer 780. In other words, in the embodiment, the place in the display module where the scattering layer 780 is disposed is substantially the same as the place in the display module 100 where the metal grid layer 180 is disposed.

The scattering layer 780 includes a plurality of scattering particles 784 and a sealant material 786, while the scattering particles 784 are distributed in the sealant material 786. The sealant material 786 may include adhesive materials, such as silicone, acrylic or other similar materials, and the visible light transmittance of the sealant material 786 is between 20% and 95%. The scattering particles 784 may be inorganic particles such as titanium dioxide ($TiO_2$), polymer particles or similar materials. The difference between the refractive index of the scattering particles 784 and the refractive index of the sealant material 786 is more than 0.3.

It is worth mentioning that the total volume of the scattering particles 784 is larger than 80% of a volume of the metal grid layer 780, so that the linear polarization of the light ray L2 is destroyed. In addition, the radius of each scattering particles 184 and each scattering particles 784 may be in the range of 0.58 time of the wavelength of visible light (between about 380 nm and 780 nm). Specifically, the radius of each scattering particle 184 and each scattering particle 784 is between 220.4 nm and 7800 nm.

In conclusion, when the plurality of display modules are connected to each other so as to form a large-sized display, the connecting region between the display modules is located at the fringe region of the LCD panel. Since there is no pixel located at the fringe region of the LCD panel, the seam between adjacent display modules is formed, so that the images which are assembled by adjacent LCD panels are discontinuous. Thus, the LED display panel is disposed on the fringe region of the backlight module, so that the LED display panel can emit the light ray toward the fringe region. As a result, the light ray emitted by the LED display panel can enter the user's eyes through the fringe region of the LCD panel. Therefore, the discontinuity of the images due to the seam decreases, and thereby improving the quality of images.

Furthermore, since the light ray emitted by the LED display panel is blocked by the upper and lower polarizers of the LCD panel, the light ray is unable to pass through the sealant. Therefore, the depolarizing structure, such as the metal grid layer with grid wire or scattering layer with scattering particles, are disposed between the polarizers in at least one embodiment of the disclosure so as to change the polarizing angles (or polarization state) of the light ray. Thus, most of the light ray can pass through the LCD panel through the polarizers, and then enters the user's eyes.

Although the embodiments of the present disclosure have been disclosed as above in the embodiments, they are not intended to limit the embodiments of the present disclosure. Any person having ordinary skill in the art can make various changes and modifications without departing from the spirit and the scope of the embodiments of the present disclosure. Therefore, the protection scope of the embodiments of the present disclosure should be determined according to the scope of the appended claims.

What is claimed is:

1. A display module, comprising:

a LCD panel having a light exiting region and a fringe region surrounding the light exiting region, and the LCD panel comprises:

two polarizers located at two opposite sides of the LCD panel separately, wherein the polarizers are crossed to each other;

a liquid crystal layer disposed between the polarizers;

a LED display panel disposed on the fringe region of the LCD panel and used to emit a first light ray toward the fringe region; and a metal grid layer disposed between the polarizers and overlapping the LED display panel in a direction of a normal line of the polarizers, wherein the first light ray passes through the polarizers and the metal grid layer, and the metal grid layer comprises:

a plurality of grid wires juxtaposed to each other, wherein a longitudinal axis of each of the grid wires extends along with an axis direction, wherein the axis direction is perpendicular to the normal line of the polarizers;

wherein a height of each of the grid wires is larger than 0.1 μm.

2. The display module of claim 1, wherein a width of each of the grid wires is smaller than 0.15 μm, and a pitch between the grid wires is smaller than 0.3 μm.

3. The display module of claim 1, wherein the metal grid layer comprises an edge line, and a first angle is between a first polarization direction of one of the polarizers and the edge line, and a second angle is between a second polarization direction of the other one of the polarizers and the edge line, wherein a value of a third angle between the axis direction of each of the grid wires and the edge line is within plus or minus 3 degree of a mean value of the first angle and the second angle.

4. The display module of claim 1, wherein the materials of the grid wires comprise aluminum or copper.

5. The display module of claim 1, further comprises:

a backlight module, wherein the LCD panel is disposed on the backlight module, and the backlight module is used to emit a second light ray toward the light exiting region of the LCD panel.

6. The display module of claim 5, wherein the LED display panel comprises:

a plurality of LED components disposed adjacently to a side surface of the backlight module and arranged in at least two lines along with an extending direction of the fringe region of the LCD panel.

7. The display module of claim 6, wherein each of the plurality of LED components is a white light LED component.

8. The display module of claim 1, wherein the metal grid layer further comprises:

a plurality of scattering particles, and a total volume of the scattering particles is larger than 20% of a volume of the metal grid layer.

9. The display module of claim 8, wherein a height of each of the grid wires is between 0.1 μm and 0.9 μm.

10. The display module of claim 9, wherein a width of each of the grid wires is smaller than 5 μm, and a pitch between the grid wires is smaller than 6 μm.

11. The display module of claim 8, wherein the metal grid layer comprises an edge line, and a first angle is between a first polarization direction of one of the polarizers and the edge line, and a second angle is between a second polarization direction of the other one of the polarizers and the edge line, wherein a value of a third angle between the axis direction of each of the grid wires and the edge line is within plus or minus 15 degree of a mean value of the first angle and the second angle.

12. The display module of claim 8, wherein the metal grid layer further comprises:

a sealant material disposed on the grid wires, wherein the scattering particles are distributed in the sealant material, and a difference between a refractive index of the scattering particles and a refractive index of the sealant material is more than 0.3.

13. A display module, comprising:

a LCD panel having a light exiting region and a fringe region surrounding the light exiting region, and the LCD panel comprises:

two polarizers, wherein the polarizers are crossed to each other;

a liquid crystal layer disposed between the polarizers;

a LED display panel disposed on the fringe region of the LCD panel and used to emit a light ray toward the fringe region; and a scattering layer, disposed between the polarizers and overlapping the LED display panel, wherein the light ray passes through the polarizers and the scattering layer, and the scattering layer comprises:

a plurality of scattering particles, wherein a total volume of the scattering particles is larger than 80% of a volume of the scattering layer, and a radius of each of the scattering particles is between 220.4 nm and 7800 nm.

14. The display module of claim 13, wherein the scattering layer further comprises:

a sealant material, wherein the scattering particles are distributed in the sealant material, and a difference between a refractive index of the scattering particles and a refractive index of the sealant material is more than 0.3.

15. The display module of claim 13, wherein the radius of each of the scattering particles is in a range of 0.58 time of the wavelength of visible light.

* * * * *